United States Patent
Zheng et al.

(10) Patent No.: US 12,229,991 B2
(45) Date of Patent: Feb. 18, 2025

(54) IMAGE DISPLAY METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yuanli Zheng, Shenzhen (CN); Jianping Xie, Shenzhen (CN); Jie Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 224 days.

(21) Appl. No.: 17/970,021

(22) Filed: Oct. 20, 2022

(65) Prior Publication Data

US 2023/0037922 A1 Feb. 9, 2023

Related U.S. Application Data

(63) Continuation of application No. PCT/CN2021/100490, filed on Jun. 17, 2021.

(30) Foreign Application Priority Data

Jul. 30, 2020 (CN) .......................... 202010753135.0

(51) Int. Cl.
  *G06T 7/73* (2017.01)
  *G06F 3/01* (2006.01)
  *G06F 3/0346* (2013.01)
  *G06T 19/00* (2011.01)

(52) U.S. Cl.
  CPC ................ *G06T 7/74* (2017.01); *G06F 3/011* (2013.01); *G06F 3/0346* (2013.01); *G06T 19/006* (2013.01); *G06T 2207/30244* (2013.01)

(58) Field of Classification Search
  CPC ................... G06T 7/74; G06T 19/006; G06T 2207/30244; G06T 7/73; G06F 3/011;
  (Continued)

(56) References Cited

U.S. PATENT DOCUMENTS 11,270,460 B2   3/2022   Qiao et al.
11,762,623 B2 *  9/2023   McCall .................. G06V 20/20
                                                    345/633

(Continued)

FOREIGN PATENT DOCUMENTS

CN    109126121 A    1/2019
CN    110264509 A    9/2019

(Continued)

OTHER PUBLICATIONS

The European Patent Office (EPO) The Extended European Search Report for 21850955.2 Sep. 6, 2023 10 Pages.

(Continued)

*Primary Examiner* — Ryan R Yang
(74) *Attorney, Agent, or Firm* — ANOVA LAW GROUP PLLC

(57) ABSTRACT

An image display method includes: obtaining a homography matrix between a first target plane and a second target plane according to the first target plane and the second target plane; obtaining a target displacement according to the homography matrix and an attitude; obtaining a target pose according to the target displacement, the target pose including a position and an attitude of a camera coordinate system of a current frame image in a world coordinate system; and displaying an AR image according to the target pose.

17 Claims, 5 Drawing Sheets

(58) Field of Classification Search
CPC ........ G06F 3/0346; G06F 3/013; G06F 3/014; G06F 3/017; G06F 3/012; G06V 10/74; G06V 20/20
See application file for complete search history.

(56) References Cited

U.S. PATENT DOCUMENTS

2016/0364867 A1    12/2016  Moteki et al.
2020/0184727 A1*   6/2020   Ha .................. G01C 21/005

FOREIGN PATENT DOCUMENTS

CN     111897429 A     11/2020
KR     101340555 B1    12/2013

OTHER PUBLICATIONS

Du, Sicong, et al. "Gpo: Global plane optimization for fast and accurate monocular slam initialization." 2020 IEEE International Conference on Robotics and Automation (ICRA). IEEE, 2020. 8 pages.

Ling, Li, Ian S. Burnett, and Eva Cheng. "A flexible markerless registration method for video augmented reality." 2011 IEEE 13th International Workshop on Multimedia Signal Processing. IEEE, 2011. 6 pages.

The World Intellectual Property Organization (WIPO) International Search Report for PCT/CN2021/100490 Sep. 15, 2021 6 Pages (including translation).

* cited by examiner

IMAGE DISPLAY METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2021/100490, entitled "IMAGE DISPLAY METHOD AND APPARATUS, AND COMPUTER DEVICE AND STORAGE MEDIUM" and filed on Jun. 17, 2021, which claims priority to Chinese Patent Application No. 202010753135.0, entitled "IMAGE DISPLAY METHOD AND APPARATUS, COMPUTER DEVICE, AND STORAGE MEDIUM" and filed with the China National Intellectual Property Administration on Jul. 30, 2020, the entire contents of both of which are incorporated herein by reference.

FIELD OF THE TECHNOLOGY

The present disclosure relates to the field of intelligent terminal technologies, and in particular, to image display.

BACKGROUND OF THE DISCLOSURE

With the development of intelligent terminal technologies, terminals may already provide a variety of image displays. An Augmented Reality (AR) model has a good visual effect, and therefore many terminals may display objects through AR models.

At present, to display an AR model in a terminal, an AR model that needs to be placed is usually positioned in a three-dimensional space. The following methods are usually used for positioning: For example, the AR model may be positioned in the three-dimensional space by using a simultaneous localization and mapping (SLAM) method, a visual inertial odometry (VIO) method, and the like.

SUMMARY

Embodiments of the present disclosure provide an image display method and apparatus, a computer device, and a storage medium, which can improve the efficiency of AR model positioning in an AR device and enhance the effect of displaying an AR model image. The technical solutions are as follows:

In an aspect, an embodiment of the present disclosure provides an image display method, the method being performed by an AR device, the method including: obtaining a homography matrix between a first target plane and a second target plane according to the first target plane and the second target plane, the first target plane being a target plane of a current frame image, the second target plane being a target plane of a first frame image; obtaining a target displacement according to the homography matrix and an attitude, the attitude indicating a direction vector of a current orientation of an IMU coordinate system relative to an original orientation of the IMU coordinate system, the target displacement being a displacement of a camera coordinate system of the current frame image relative to a camera coordinate system of the first frame image; obtaining a target pose according to the target displacement, the target pose including a position and an attitude of the camera coordinate system of the current frame image in a world coordinate system; and displaying an AR image in the current frame image according to the target pose.

In another aspect, an embodiment of the present disclosure further provides an image display apparatus, including: a matrix obtaining module, configured to obtain a homography matrix between a first target plane and a second target plane according to the first target plane and the second target plane, the first target plane being a target plane of a current frame image, the second target plane being a target plane of a first frame image; a displacement obtaining module, configured to obtain a target displacement according to the homography matrix and an attitude, the attitude indicating a direction vector of a current orientation of an IMU coordinate system relative to an original orientation of the IMU coordinate system, the target displacement being a displacement of a camera coordinate system of the current frame image relative to a camera coordinate system of the first frame image, a pose obtaining module, configured to obtain a target pose according to the target displacement, the target pose including a position and an attitude of the camera coordinate system of the current frame image in a world coordinate system; and an image display module, configured to display an AR image in the current frame image according to the target pose.

According to another aspect, an embodiment of the present disclosure further provides a computer device, the computer device including a processor and a memory, the memory storing at least one instruction, at least one program, a code set, or an instruction set, the at least one instruction, the at least one program, the code set, or the instruction set being loaded and executed by the processor to implement the image display method provided in the foregoing aspect.

According to still another aspect, an embodiment of the present disclosure further provides a non-transitory computer-readable storage medium, the storage medium storing a computer program, the computer program being configured to perform the image display method provided in the foregoing aspect.

In an aspect, an embodiment of the present disclosure provides a computer program product or a computer program. The computer program product or the computer program includes computer instructions, the computer instructions being stored in a computer-readable storage medium. A processor of a computer device reads the computer instructions from the computer-readable storage medium, and executes the computer instructions, to cause the computer device to perform the image display method provided in the foregoing aspect.

The technical solutions provided in the embodiments of the present disclosure achieve at least the following beneficial effects:

In the present disclosure, an AR device obtains a homography matrix between a target plane of a current frame image and a target plane of a first frame image according to the two target planes, and obtains a target displacement from the homography matrix in combination with an inertial measurement unit attitude, the target displacement being a displacement of a camera coordinate system of the current frame image relative to a camera coordinate system of the first frame image; and the AR device obtains a position and an attitude of the camera coordinate system of the current frame image in a world coordinate system according to the target displacement, and displays an AR image in the current frame image according to the position and the attitude. The step of translating an AR device for initialization is not required, and the reconstruction of a large number of points by the AR device in a three-dimensional space is also avoided, thereby reducing the computational complexity of the AR device and improving the efficiency of AR model positioning in the AR device and the effect of displaying an AR model image.

DESCRIPTION OF EMBODIMENTS

Figure 1:
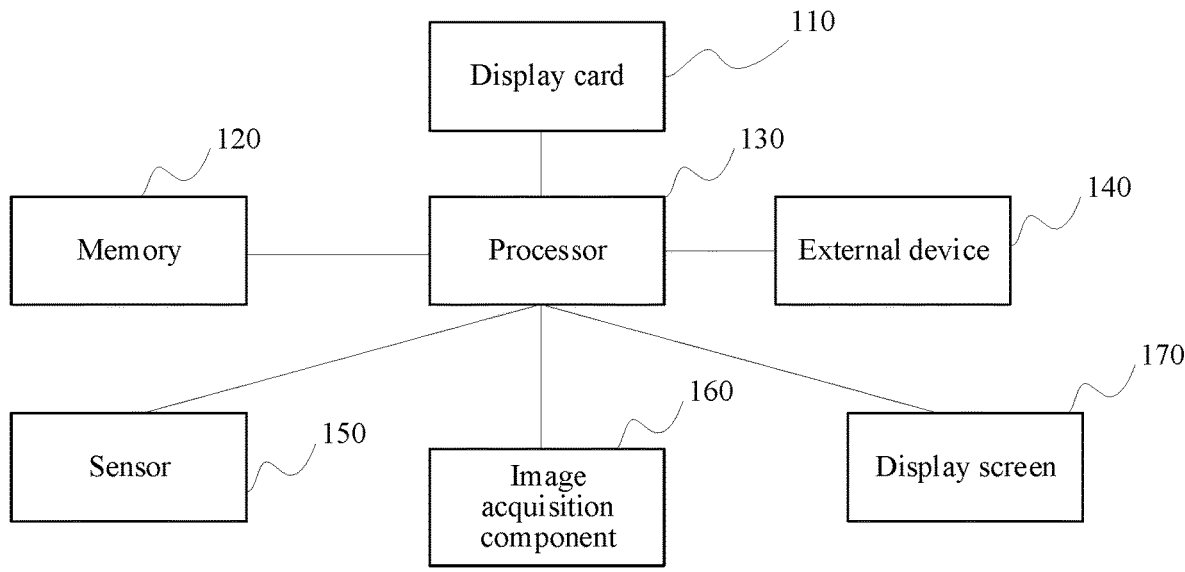
FIG. 1 is a schematic structural diagram of a camera AR head-mounted device according to an embodiment of the present disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with the present disclosure. On the contrary, the implementations are merely examples of apparatuses and methods that are described in detail in the appended claims and that are consistent with some aspects of the present disclosure.

The solutions provided by the present disclosure are applicable to a real life scenario in which a network developer deploys a network environment. For ease of understanding, the following is a brief introduction to some specific terms and application scenarios.

1) AR is a technology that calculates a position and an angle of a camera image in real time and adds a corresponding image. In this technology, an image may be superimposed onto a real world on a display screen of a lens through projection or direct display, and an operator may interact with the display image through a device.

2) Inertial Measurement Unit (IMU) is a device that measures triaxial attitude angle (or angular speed) and an acceleration of an object. Generally, one IMU includes three uniaxial accelerometers and three uniaxial gyroscopes. The accelerometers detect acceleration signals of an object in independent three axes of a carrier coordinate system, and the gyroscopes detect angular velocity signals of a carrier relative to a navigation coordinate system, to measure angular velocity and acceleration of the object in a three-dimensional space and calculate an attitude of the object.

3) Pose includes a position and an attitude. The position can represent position coordinates of an object in a coordinate system, and the attitude may represent a direction vector of the object in the coordinate system.

The solutions provided by the present disclosure are applicable to a real scene in which a person displays an AR model through a device in daily life. For ease of understanding, the following is a brief introduction to some terms involved in the embodiments of the present disclosure.

The AR technology may include but is not limited to the following three types according to the projection mode: projection AR, display AR, and camera AR. A projection device of the projection AR is equipped with a transparent lens, and an image of a virtual world may be projected onto the transparent lens. A projection device of the display AR is equipped with a transparent display screen, and a virtual world may be directly displayed on the display screen. Camera AR is also called pseudo AR. An image acquisition component of this kind of device can superimpose a real world and a virtual world on the display screen of the device by taking a scene of the real world.

FIG. 1 is a schematic structural diagram of a camera AR head-mounted device according to an embodiment of the present disclosure. As shown in FIG. 1, the device includes a display card 110, a memory 120, a processor 130, an external device 140, a sensor 150, an image acquisition component 160, and a display screen 170.

In some embodiments, the AR head-mounted device may scan or shoot a scene in real life through the image acquisition component 160, and then transmit the scanned or shot data to the processor 130, and the data is displayed on the display screen 170 after being processed by the processor 130. The image acquisition component 160 may include a camera. In some embodiments, the camera may be a depth camera. A specific quantity of cameras may be specified by a developer. Pre-stored image data in the memory 120 may be processed by the processor 130 and then displayed on the display screen 170. Further, the pre-stored image data in the memory 120 may be superimposed onto the image scanned or shot by the image acquisition component 160 to be displayed together on the display screen 170.

In some embodiments, the memory 120 may store motion image information of various movements and requirements of the various movements, and may further store corresponding user account information. In addition, the memory 120 may be an integrated local storage device or an extended storage device such as a removable memory card. This is not limited in the embodiments of the present disclosure.

In some embodiments, the external device 140 may include but is not limited to one or a combination of image recognition technology, gesture recognition technology, and eye tracking technology, for example, a computer device with image recognition technology, smart gloves with gesture recognition technology, and an eye tracker with eye tracking technology.

In some embodiments, the sensor 150 may include but is not limited to one or a combination of an acceleration sensor, a gyroscope sensor, a gravity sensor, a temperature sensor, and an infrared sensor. The sensor 150 may detect a user's movement through a sensing principle, and the movement may be finally displayed on the display screen 170 and presented to the user through a series of processing by the entire AR head-mounted device.

In some embodiments, in current application, in addition to the AR head-mounted device shown in FIG. 1, a smart phone, a tablet computer, an e-book reader, smart glasses, a smart watch, a Moving Picture Experts Group Audio Layer III (MP3) player, a Moving Picture Experts Group Audio Layer IV (MP4) player, a notebook computer, a laptop computer, a desktop computer and other various terminals can also provide an AR model display function. That is, these terminals are AR devices.

At present, the following methods are usually used for positioning an AR device in a three-dimensional space. for example, an AR model is positioned in the three-dimensional space by using a SLAM method, a VIO method, and the like. SLAM technology and VIO technology not only require a higher precision inertial measurement unit, but also need to reconstruct a point cloud including tens of thousands of points before positioning, which requires high computing performance of an AR device. Therefore, there are limitations in application. In addition, due to theoretical limitations, a user needs to translate an AR device to initialize the system. Before placing an AR model in a three-dimensional space, a user needs to actively translate the AR device and wait for the AR device to identify a plane and then to place the AR model.

Figure 2:
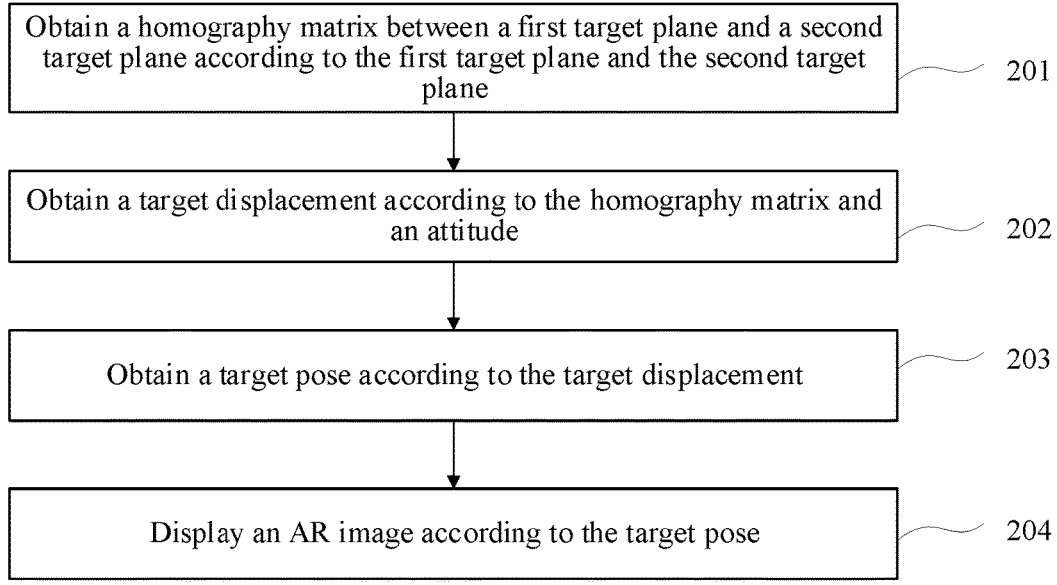
FIG. 2 is a method flowchart of an image display method according to an embodiment of the present disclosure.

To solve the problems in the foregoing related technologies, an embodiment of the present disclosure provides an image display method. FIG. 2 is a method flowchart of an image display method according to an embodiment of the present disclosure. The method can be applied to the AR device shown in FIG. 1. As shown in FIG. 2, the method may include the following steps:

S201. Obtain a homography matrix between a first target plane and a second target plane according to the first target plane and the second target plane.

The first target plane is a target plane of a current frame image, and the second target plane is a target plane of a first frame image. In some embodiments, the target plane is a plane of a three-dimensional space in which an AR model is located in the current frame image. The AR device obtains the homography matrix between the two target planes through the same target plane in the current frame image and the first frame image. The first frame image is an image when the AR device displays an AR model for the first time, and the current frame image is an image currently displayed by the AR device.

S202. Obtain a target displacement according to the homography matrix and an attitude. The attitude may be measured by an IMU associated with the AR device. The attitude may also be referred to as IMU attitude.

The IMU attitude is used for indicating a direction vector of a current orientation of an IMU coordinate system (e.g., coordinate system of the IMU associated with the AR device) relative to an original orientation of the IMU coordinate system. The IMU attitude includes an IMU attitude corresponding to the current frame image and an IMU attitude corresponding to the first frame image. The target displacement is a displacement of a camera coordinate system of the current frame image relative to a camera coordinate system of the first frame image. That is, in the first frame image, an IMU in the AR device may correspond to one IMU attitude, and in the current frame image, the IMU in the AR device may correspond to another IMU attitude.

The camera coordinate system is a coordinate system established according to an image shooting component in the AR device. For example, the AR device is a mobile phone. In this case, the image shooting component may be a camera of the mobile phone, the AR device is a head-mounted device, and the image shooting component may be a camera for displaying an AR model in the AR device. In some embodiments, as the AR device moves, the position of the image shooting component of the AR device also changes, and a coordinate system of the image shooting component changes accordingly. The target displacement may indicate a displacement between the two camera coordinate systems before and after the change.

S203. Obtain a target pose according to the target displacement.

The target pose is a position and an attitude of the camera coordinate system of the current frame image in a world coordinate system.

In some embodiments, the world coordinate system is a world coordinate system established by the AR device according to a placement position of an AR model in the first frame image and the target plane. That is, the target pose is a position and an attitude of the camera coordinate system of the current frame image in the world coordinate system.

S204. Display an AR image according to the target pose.

After obtaining the target pose, the AR device displays a corresponding AR image in the current frame image.

In summary, in the present disclosure, an AR device obtains a homography matrix between a target plane of a current frame image and a target plane of a first frame image according to the two target planes, and obtains a target displacement from the homography matrix in combination with an IMU attitude, the target displacement being a displacement of a camera coordinate system of the current frame image relative to a camera coordinate system of the first frame image; and the AR device obtains a position and an attitude of the camera coordinate system of the current frame image in a world coordinate system according to the target displacement, and displays an AR image according to the position and the attitude. The step of translating an AR device for initialization is not required, and the reconstruction of a large number of points by the AR device in a three-dimensional space is also avoided, thereby reducing the computational complexity of the AR device and improving the efficiency of AR model positioning in the AR device and the effect of displaying an AR model image.

In one embodiment, according to the first target plane and the second target plane, the AR device obtains the homography matrix between the first target plane and the second target plane, the homography matrix including the following two homography matrices. The AR device may calculate a first homography matrix between the first target plane and the second target plane according to a target matching algorithm; and the AR device may also calculate a second homography matrix between the first target plane and the second target plane according to the target displacement and the IMU attitude. The foregoing embodiment shown in FIG. 2 is described by using an example in which the homography matrix obtained by the AR device includes the first homography matrix and the second homography matrix.

Figure 3:
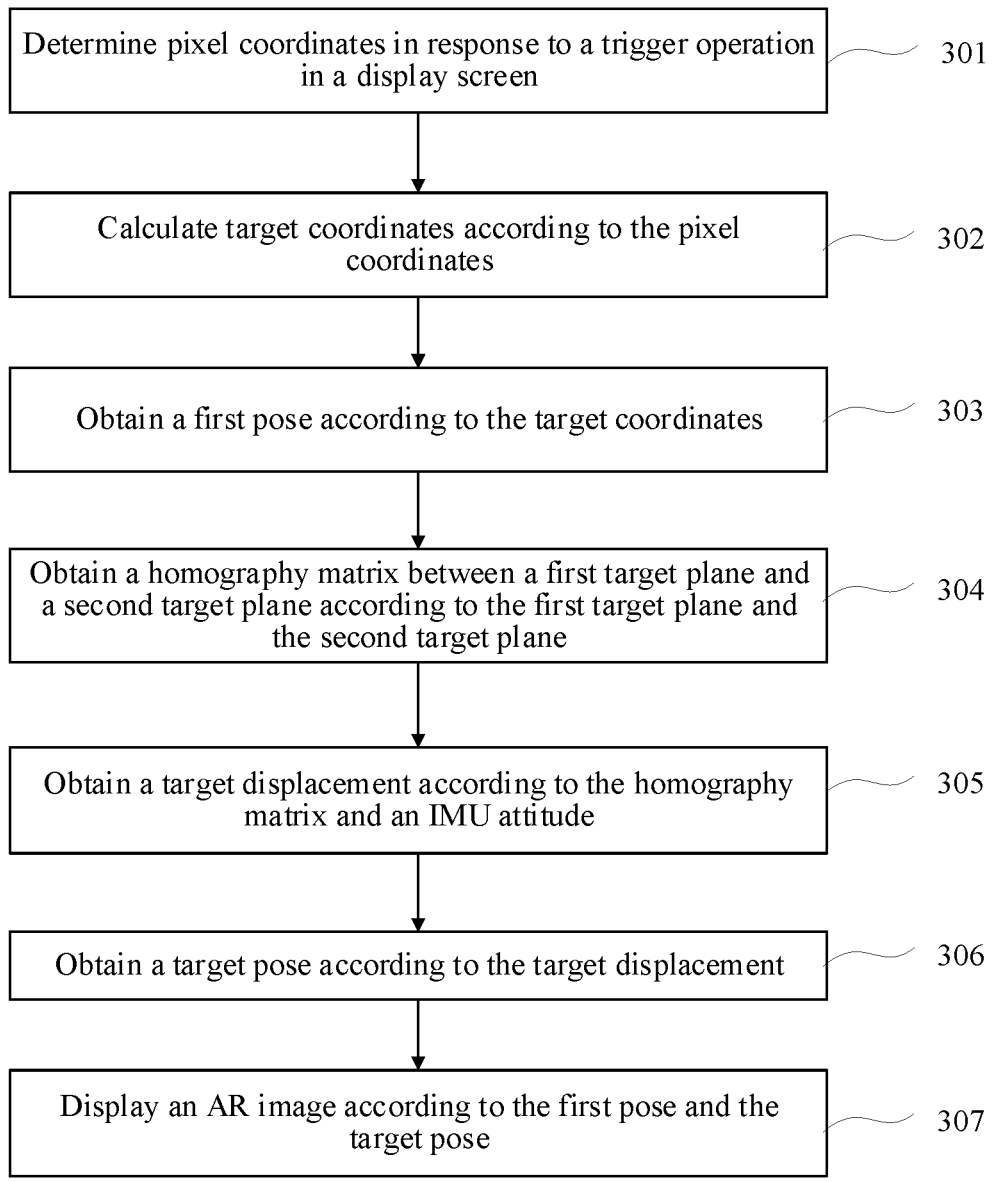
FIG. 3 is a method flowchart of an image display method according to an embodiment of the present disclosure.

FIG. 3 is a method flowchart of an image display method according to an embodiment of the present disclosure. The method can be applied to the AR device shown in FIG. 1. As shown in FIG. 3, the method may include the following steps.

S301. Determine pixel coordinates in response to a trigger operation in a display screen.

The trigger operation is configured to trigger placing of an AR model.

In some embodiments, in the present disclosure, the AR device may be a terminal including a display screen. A first frame image is an image displayed on the display screen after the AR device places the AR model in a virtual space displayed on the display screen. For example, a user taps the display screen of the AR device to place the AR model in a virtual space. In this case, the AR device may obtain a pixel position on the display screen. Coordinates of the pixel position are position coordinates based on a pixel coordinate system of the display screen of the AR device. For example, a pixel at the 16th row and 18th column is triggered, and then position coordinates of the pixel in the pixel coordinate system are pixel coordinates determined in this step.

In some embodiments, in practical application, when more than one pixel is touched on the display screen, the AR device may determine position coordinates of a center pixel in a touch area in the pixel coordinate system as pixel coordinates determined in this step. That is, after the user touches and places the AR model on the display screen, the AR device may obtain the position of the central pixel in the touch area on the display screen, and determine the position coordinates of the central pixel in the pixel coordinate system according to the position of the central pixel.

In one embodiment, the AR device can determine a placement position of the AR model according to the pixel coordinates, and establish the world coordinate system by using the placement position of the AR model as an origin of the world coordinate system.

In some embodiments, the AR device may obtain a three-dimensional point O in a horizontal plane corresponding to the pixel position in a displayed three-dimensional space according to the position of the pixel obtained above, and the three-dimensional point O is the placement position of the AR model in the three-dimensional space.

In some embodiments, after determining the placement position of the AR model, according to the placement position of the AR model, the AR device may establish a three-dimensional world coordinate system in the virtual space by using the placement position of the AR model (that is, the foregoing three-dimensional point O) as the origin and using the horizontal plane in which the placement position of the AR model is located is placed as a plane in which the two coordinate axes in the world coordinate system are located.

S302. Calculate target coordinates according to the pixel coordinates.

The target coordinates are coordinates of the placement position of the AR model relative to the camera coordinate system.

In some embodiments, the target coordinates represent coordinates of the position of the AR model displayed in the three-dimensional space in the camera coordinate system. The target coordinates are represented by $P_1$. The AR device may calculate the target coordinates according to the pixel coordinates. For example, the target coordinates may be calculated according to the following Formula [1]:

$$P_1 = \frac{d}{(-n^T(K^{-1}P'))}(K^{-1}P'),\quad [1]$$

where d is a constant value preset by a developer, K is an intrinsic matrix of an image shooting component of the AR device, n is a normal vector of the horizontal plane in the camera coordinate system, T represents a transpose of n, and P' is homogeneous coordinates converted from coordinates of a touch point. That is, the AR device may convert the coordinates of the touch point into the form P' of the homogeneous coordinates, and substitute P' into Formula [1] to obtain $P_1$. When coordinates of a touch point P is (u, v), homogeneous coordinates P' of P is (u, v, 1).

In one embodiment, the intrinsic matrix K of the image shooting component may be as follows:

$$K = \begin{bmatrix} f, 0, x \\ 0, f, y \\ 0, 0, 1 \end{bmatrix},$$

where f is a focal length of the image shooting component, in pixels. x represents horizontal coordinates of an optical center of the image shooting component in the camera coordinate system, and y represents vertical coordinates of the optical center of the image shooting component in the camera coordinate system.

In some embodiments, the AR device may obtain n through a rotational attitude of the image shooting component corresponding to the first frame image. That is, in step 301, after the user places the AR model, the AR device may obtain an IMU attitude $R_{IMU1}$ from an IMU of the AR device. The IMU attitude $R_{IMU1}$ b is used for indicating a direction vector of a current orientation of an IMU coordinate system relative to an original orientation of the IMU coordinate system. For example, an original orientation of the IMU coordinate system is north horizontally, and a current orientation of the IMU coordinate system is another direction in the first frame image. The IMU attitude $R_{IMU1}$ may describe a change value between the two. The foregoing AR device calculates the rotational attitude of the image shooting component corresponding to the first frame image according to the IMU attitude $R_{IMU1}$, and the AR device may substitute $R_{IMU1}$ into the following Formula [2].

$$R_1 = R^-_{ic} * R_{IMU1} * R_{ic} \quad [2],$$

where $R_{ic}$ is a rotational attitude of the camera coordinate system relative to the IMU coordinate system. In some embodiments, a first direction is used as an attitude of the IMU coordinate system. When the image shooting component faces the first direction, the rotational attitude of the image shooting component is represented by $R_G$, and then $R_G$ is as follows:

$$R_G = \begin{bmatrix} 1, 0, 0 \\ 0, 1, 0 \\ 0, 0, 1 \end{bmatrix}.$$

In some embodiments, the first direction may be north horizontally.

The AR device calculates the rotational attitude $R_1$ corresponding to the image shooting component in the first frame image according to Formula [2], and then substitutes $R_1$ into Formula [3], $$N = R_1^{-1} * (0,0,-1)^T \quad [3]$$

The AR device calculates a normal vector n of the horizontal plane through Formula [3].

S303. Obtain a first pose according to the target coordinates.

In one embodiment, the AR device may obtain a first pose according to the target coordinates, the first pose being a position and an attitude of the camera coordinate system of the first frame image in the world coordinate system. When an AR image is displayed according to the target pose, the AR image is displayed according to the first pose and the target pose.

To calculate the first pose, the target coordinates may be substituted into Formula [4] to calculate the target pose. $T_{W,C1}$ represents the first pose, and Formula [4] is as follows:

$$T_{W,C1} = \begin{bmatrix} R_1, -R_1 P_1 \\ A, 1 \end{bmatrix}, \quad [4]$$

where A=(0, 0, 0).

S304. Obtain a homography matrix between a first target plane and a second target plane according to the first target plane and the second target plane.

The first target plane is a target plane of the current frame image, and the second target plane is a target plane of the first frame image. In some embodiments, the target plane may be a plane in which the AR model is placed. For example, the target plane may be a plane parallel to the horizontal plane in which the coordinates of the origin of the world coordinate system are located. In some embodiments, according to the position of the touch point on the display screen, the foregoing AR device may learn that the position of the AR model needs to be placed in the three-dimensional space, and then display the AR model on the display screen to form the first frame image.

In one embodiment, the homography matrix between the first target plane and the second target plane obtained by the AR device includes two homography matrices. One homography matrix (a first homography matrix) is calculated by the AR device according to a target matching algorithm, and the other homography matrix (a second homography matrix) is calculated by a target displacement and the IMU attitude. The target displacement is a displacement of the camera coordinate system of the current frame image relative to the camera coordinate system of the first frame image.

In some embodiments, the AR device may calculate the first homography matrix between the first target plane and the second target plane according to the target matching algorithm. The target matching algorithm may be preset in the AR device by a developer. The target matching algorithm may be any of the matching algorithms corresponding to a characteristic point algorithm and a template matching algorithm.

In some embodiments, the first homography matrix calculated by the AR device between the first target plane and the second target plane according to the target matching algorithm may be as follows:

$$H'_{2,1} = \begin{bmatrix} h'_{0,0}, h'_{0,1}, h'_{0,2} \\ h'_{1,0}, h'_{1,1}, h'_{1,2} \\ h'_{2,0}, h'_{2,1}, h'_{2,2} \end{bmatrix},$$

where $H'_{2,1}$ represents the first homography matrix between the first target plane and the second target plane.

In some embodiments, for ease of calculation, the AR device may divide the value of each element in the first homography matrix obtained above by the value of an element in the last row and the last column, and $H_{2,1}$. Then, $H_{2,1}$ may be as follows:

$$H_{2,1} = \begin{bmatrix} h'_{0,0}/h'_{2,2}, h'_{0,1}/h'_{2,2}, h'_{0,2}/h'_{2,2} \\ h'_{1,0}/h'_{2,2}, h'_{1,1}/h'_{2,2}, h'_{1,2}/h'_{2,2} \\ h'_{2,0}/h'_{2,2}, h'_{2,1}/h'_{2,2}, h'_{2,2}/h'_{2,2} \end{bmatrix}.$$

After simplification, $H_{2,1}$ may be represented as follows:

$$H_{2,1} = \begin{bmatrix} h_{0,0}, h_{0,1}, h_{0,2} \\ h_{1,0}, h_{1,1}, h_{1,2} \\ h_{2,0}, h_{2,1}, 1 \end{bmatrix}.$$

In one embodiment, the AR device may further calculate the second homography matrix between the first target plane and the second target plane according to the target displacement and the IMU attitude.

In some embodiments, the AR device obtains a rotational attitude of an image shooting component corresponding to the current frame image according to the IMU attitude corresponding to the current frame image, the rotational attitude indicating an attitude of the image shooting component relative to a target direction, obtains a rotational attitude of the image shooting component corresponding to the first frame image according to the IMU attitude corresponding to the first frame image; calculates a normal vector of the target plane according to the rotational attitude of the image shooting component corresponding to the first frame image; and calculates the second homography matrix according to the target displacement, the rotational attitude of the image shooting component corresponding to the current frame image, the rotational attitude of the image shooting component corresponding to the first frame image, and the normal vector of the target plane.

The AR device obtains the rotational attitude of the image shooting component corresponding to the current frame image according to the IMU attitude corresponding to the current frame image. Reference may be made to the manner in which the AR device obtains the rotational attitude of the image shooting component corresponding to the first frame image according to the IMU attitude corresponding to the first frame image in Formula [2]. That is, when $R_2$ represents the rotational attitude of the image shooting component corresponding to the current frame image, the AR device may obtain the IMU attitude $R_{IMU2}$ from the IMU of the AR device in the current frame image, and calculate the rotational attitude of the image shooting component corresponding to the current frame image according to the IMU attitude $R_{IMU2}$, and the AR device may substitute $R_{IMU2}$ into the following Formula [5].

$$R_2 = R^{-1}_{ic} * R_{IMU2} * R_{ic} \qquad [5].$$

The AR device obtains the second homography matrix according to Formula [6].

$$M'_{2,1} = K(R_2^{-1} * R_1 - d^{-1}(t_{2,1}n^T))K^{-1} \qquad [6],$$

where $t_{2,1}$ represents the target displacement. In some embodiments, when $M'_{2,1}$ is represented in a matrix form, the second homography matrix $M'_{2,1}$ between the first target plane and the second target plane may be as follows:

$$M'_{2,1} = \begin{bmatrix} m'_{0,0}, m'_{0,1}, m'_{0,2} \\ m'_{1,0}, m'_{1,1}, m'_{1,2} \\ m'_{2,0}, m'_{2,1}, m'_{2,2} \end{bmatrix}.$$

In some embodiments, for ease of calculation, the AR device can also divide a value of each element in the second homography matrix obtained above by the value of the element in the last row and the last column, and represent it by $M_{2,1}$. Then, $M_{2,1}$ may be as follows:

$$M_{2,1} = \begin{bmatrix} m'_{0,0}/m'_{2,2}, m'_{0,1}/m'_{2,2}, m'_{0,2}/m'_{2,2} \\ m'_{1,0}/m'_{2,2}, m'_{1,1}/m'_{2,2}, m'_{1,2}/m'_{2,2} \\ m'_{2,0}/m'_{2,2}, m'_{2,1}/m'_{2,2}, 1 \end{bmatrix}.$$

After simplification, $M_{2,1}$ is represented as follows:

$$M_{2,1} = \begin{bmatrix} m_{0,0}, m_{0,1}, m_{0,2} \\ m_{1,0}, m_{1,1}, m_{1,2} \\ m_{2,0}, m_{2,1}, 1 \end{bmatrix}.$$

In some embodiments, the AR device may use the first homography matrix and the second homography matrix obtained above as homography matrices between the first target plane and the second target plane.

S305. Obtain a target displacement according to the homography matrix and an IMU attitude.

The IMU attitude includes an IMU attitude corresponding to the current frame image and an IMU attitude corresponding to the first frame image, and the target displacement is a displacement of the camera coordinate system of the current frame image relative to the camera coordinate system of the first frame image.

In one embodiment, the AR device may establish a target expression according to the first homography matrix and the second homography matrix, the target expression indicating that the first homography matrix is equal to the second homography matrix, the target expression including a displacement factor used for denoting the target displacement; adjust a value of the displacement factor based on an adjustment target of reducing a value of the target expression; and determine a value corresponding to the displacement factor when the value of the target expression is minimal as the target displacement.

For example, according to the first homography matrix $H_{2,1}$ and the second homography matrix $M_{2,1}$, a target expression F may be established, and $F=(h_{0,0}-m_{0,0})^2+(h_{0,1}-m_{0,1})^2+(h_{0,2}-m_{0,2})^2+(h_{1,0}-m_{1,0})^2+(h_{1,1}-m_{1,1})^2+(h_{1,2}-m_{1,2})^2+(h_{2,0}-m_{2,0})^2+(h_{2,1}-m_{2,1})^2+(h_{2,2}-m_{2,2})^2$. Due to $h_{2,2}=m_{2,2}=1$, F may be represented as $F=(h_{0,0}-m_{0,0})^2+(h_{0,1}-m_{0,1})^2+(h_{0,2}-m_{0,2})^2+(h_{1,0}-m_{1,0})^2+(h_{1,1}-m_{1,1})^2+(h_{1,2}-m_{1,2})^2+(h_{2,0}-m_{2,0})^2+(h_{2,1}-m_{2,1})^2$.

In some embodiments, the AR device may adjust the value of $t_{2,1}$ in the above calculation of $M_{2,1}$ through a purpose optimal method to minimize F. In some embodiments, the purpose optimal method may be any one of a gradient descent algorithm, a Gauss-Newton algorithm, a Levenberg-Marquardt algorithm, and other algorithms.

Accordingly, when F is minimal, the AR device may obtain the value of $t_{2,1}$ at this time as the target displacement, so as to obtain the target displacement.

S306. Obtain a target pose according to the target displacement.

The target pose is a position and an attitude of the camera coordinate system of the current frame image in the world coordinate system.

In some embodiments, The AR device may substitute the target displacement into Formula [7] to calculate the target pose. $T_{W,C2}$ represents the target pose, and Formula [7] is as follows:

$$T_{W,C2} = \begin{bmatrix} R_2, -R_2 t_{2,1} - R_1 P_1 \\ A, 1 \end{bmatrix}, \quad [7]$$

where A=(0, 0, 0).

In some embodiments, the foregoing current frame image may be the second frame image, the third frame image, the fourth frame image or the like relative to the first frame image. The AR device may calculate a target pose corresponding to any subsequent frame image by the same method mentioned above.

S307. Display an AR image according to the first pose and the target pose.

In some embodiments, the AR device may display an AR image in the current frame image on the display screen according to the target pose. When the AR image is displayed according to the target pose, the position coordinates of the AR model in the world coordinate system remain unchanged to display the AR image.

Figure 4:
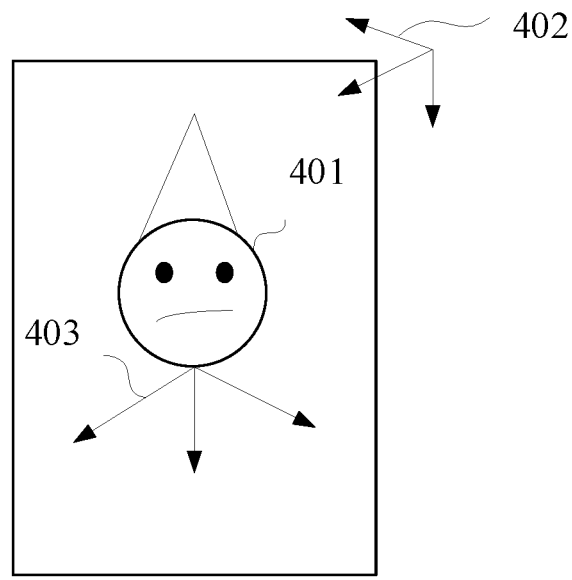
FIG. 4 and FIG. 5 are schematic interface diagrams of an AR image display interface according to some exemplary embodiments of the present disclosure.
Figure 5:
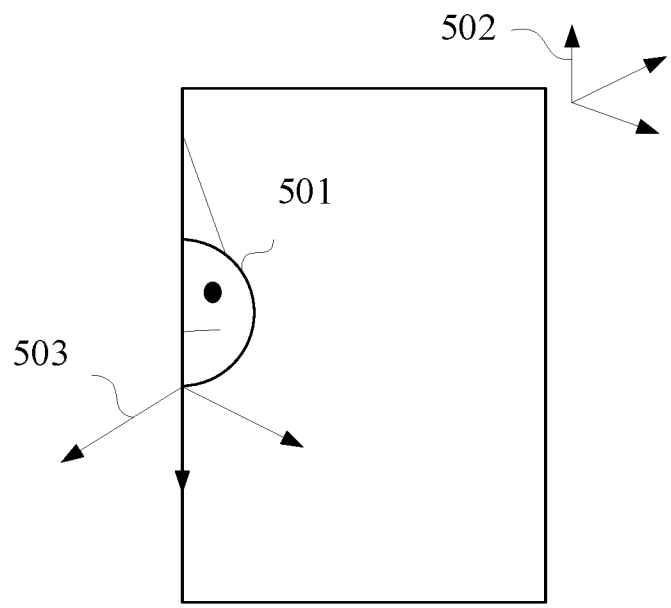

FIG. 4 and FIG. 5 are schematic interface diagrams of an AR image display interface according to an exemplary embodiment of the present disclosure. As shown in FIG. 4, an AR device includes an AR model 401, a camera coordinate system 402, and a world coordinate system 403. As shown in FIG. 5, an AR device includes an AR model 501, a camera coordinate system 502, and a world coordinate system 503. A user may move the AR device to change the position of the AR device, and relative to the position change of the AR device, a position and an attitude of the camera coordinate system 402 relative to a position and an attitude of the world coordinate system 403 also change, but the established world coordinate system 403 remains unchanged. In FIG. 5, the AR model is still displayed according to coordinates of the AR model in the world coordinate system.

In summary, in the present disclosure, an AR device obtains a homography matrix between a target plane of a current frame image and a target plane of a first frame image according to the two target planes, and obtains a target displacement from the homography matrix in combination with an IMU attitude, the target displacement being a displacement of a camera coordinate system of the current frame image relative to a camera coordinate system of the first frame image; and the AR device obtains a position and an attitude of the camera coordinate system of the current frame image in a world coordinate system according to the target displacement, and displays an AR image according to the position and the attitude. The step of translating an AR device for initialization is not required, and the reconstruction of a large number of points by the AR device in a three-dimensional space is also avoided, thereby reducing the computational complexity of the AR device and improving the efficiency of AR model positioning in the AR device and the effect of displaying an AR model image.

The following is an apparatus embodiment of the present disclosure, which can be used to perform the method embodiments of the present disclosure. For details not disclosed in the apparatus embodiment of the present disclosure, reference may be made to the method embodiments of the present disclosure.

Figure 6:
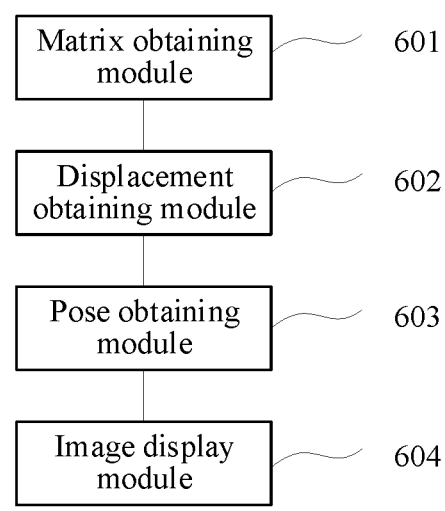
FIG. 6 is a structural block diagram of an image display apparatus according to an exemplary embodiment of the present disclosure.

FIG. 6 is a structural block diagram of an image display apparatus according to an exemplary embodiment of the present disclosure. The image display apparatus can be applied to a server to implement all or part of the steps performed by an AR device in the method shown in the embodiment corresponding to FIG. 2 or FIG. 3. The image display apparatus may include the following modules:

a matrix obtaining module 601, configured to obtain a homography matrix between a first target plane and a second target plane according to the first target plane and the second target plane, the first target plane being a target plane of a current frame image, the second target plane being a target plane of a first frame image;

a displacement obtaining module 602, configured to obtain a target displacement according to the homography matrix and an IMU attitude, the IMU attitude indicating a direction vector of a current orientation of an IMU coordinate system relative to an original orientation of the IMU coordinate system, the target displacement being a displacement of a camera coordinate system of the current frame image relative to a camera coordinate system of the first frame image;

a pose obtaining module 603, configured to obtain a target pose according to the target displacement, the target pose being a position and an attitude of the camera coordinate system of the current frame image in a world coordinate system; and an image display module 604, configured to display an AR image in the current frame image according to the target pose.

In some embodiments, the matrix obtaining module 601 includes a first calculation unit, a second calculation unit, and a first obtaining unit.

The first calculation unit is configured to calculate a first homography matrix between the first target plane and the second target plane according to a target matching algorithm.

The second calculation unit is configured to calculate a second homography matrix between the first target plane and the second target plane according to the target displacement and the IMU attitude.

The first obtaining unit is configured to use the first homography matrix and the second homography matrix as homography matrices between the first target plane and the second target plane.

In some embodiments, the IMU attitude includes an IMU attitude corresponding to the current frame image and an IMU attitude corresponding to the first frame image. The second calculation unit includes a first obtaining subunit, a second obtaining subunit, a first calculation subunit, and a second calculation subunit.

The first obtaining subunit is configured to obtain a rotational attitude of an image shooting component corresponding to the current frame image according to the IMU attitude corresponding to the current frame image, the rotational attitude indicating an attitude of the image shooting component relative to a target direction.

The second obtaining subunit is configured to obtain a rotational attitude of the image shooting component corresponding to the first frame image according to the IMU attitude corresponding to the first frame image.

The first calculation subunit is configured to calculate a normal vector of the target plane according to the rotational attitude of the image shooting component corresponding to the first frame image.

The second calculation subunit is configured to calculate the second homography matrix according to the target displacement, the rotational attitude of the image shooting component corresponding to the current frame image, the rotational attitude of the image shooting component corresponding to the first frame image, and the normal vector of the target plane.

In some embodiments, the displacement obtaining module 602 includes a first establishing unit and a second obtaining unit.

The first establishing unit is configured to establish a target expression according to the first homography matrix and the second homography matrix, the target expression indicating that the first homography matrix is equal to the second homography matrix, the target expression including a displacement factor used for denoting the target displacement.

The second obtaining unit is configured to: adjust a value of the displacement factor based on an adjustment target of reducing a value of the target expression; and determine a value corresponding to the displacement factor when the value of the target expression is minimal as the target displacement.

In some embodiments, the AR device includes a display screen, and the apparatus further includes:

a coordinate determining module, configured to determine, before the matrix obtaining module 601 obtains the homography matrix between the first target plane and the second target plane according to the first target plane and the second target plane, pixel coordinates in response to a trigger operation on the display screen, the trigger operation being configured to trigger placing of an AR model;

a position determining module, configured to determine a placement position of the AR model according to the pixel coordinates; and a coordinate system establishing module, configured to establish the world coordinate system by using the placement position of the AR model as an origin of the world coordinate system.

In some embodiments, the apparatus further includes:

a coordinate calculation module, configured to calculate target coordinates according to the pixel coordinates, the target coordinates being coordinates of the placement position of the AR model relative to the camera coordinate system; and a pose obtaining module, configured to obtain a first pose according to the target coordinates, the first pose being a position and an attitude of the camera coordinate system of the first frame image in the world coordinate system; and the image display module 604 is configured to display the AR image in the current frame image according to the first pose and the target pose.

In summary, in the present disclosure, an AR device obtains a homography matrix between a target plane of a current frame image and a target plane of a first frame image according to the two target planes, and obtains a target displacement from the homography matrix in combination with an IMU attitude, the target displacement being a displacement of a camera coordinate system of the current frame image relative to a camera coordinate system of the first frame image; and the AR device obtains a position and an attitude of the camera coordinate system of the current frame image in a world coordinate system according to the target displacement, and displays an AR image according to the position and the attitude. The step of translating an AR device for initialization is not required, and the reconstruction of a large number of points by the AR device in a three-dimensional space is also avoided, thereby reducing the computational complexity of the AR device and improving the efficiency of AR model positioning in the AR device and the effect of displaying an AR model image.

When the apparatus provided in the foregoing embodiments performs the steps, only division of the foregoing function modules is used as an example for description. In the practical application, the functions may be allocated to and completed by different functional modules according to requirements. That is, an internal structure of the apparatus is divided into different functional modules, to complete all or some of the functions described above. In addition, the apparatus provided in the foregoing embodiment belongs to the same concept as the method embodiment of the image display method. For an implementation process of the apparatus, reference is made to the method embodiment, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 7:
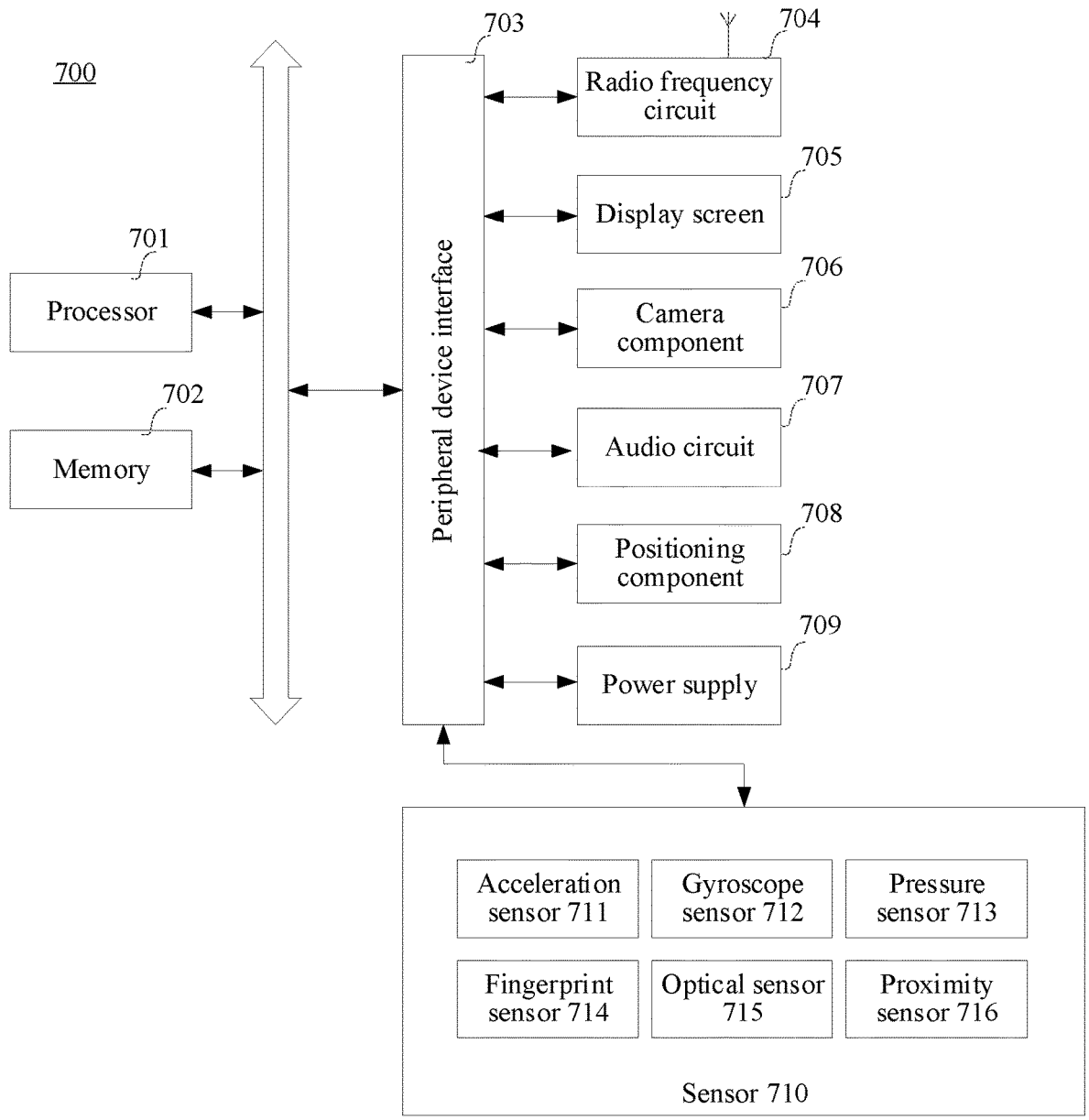
FIG. 7 is a schematic structural diagram of a computer device according to an exemplary embodiment of the present disclosure.

FIG. 7 is a structural block diagram of a computer device according to an exemplary embodiment of the present disclosure. A computer device 700 may be a user terminal, such as a smart phone, a tablet computer, a laptop computer, or a desktop computer. The computer device 700 may also be referred to as user equipment, a portable terminal, a laptop terminal, or a desktop terminal or the like.

Generally, the computer device 700 includes a processor 701 and a memory 702.

The processor 701 may include one or more processing cores. For example, the processor may be a 4-core processor or an 8-core processor. The processor 701 may be implemented by at least one hardware form of a digital signal processor (DSP), a field-programmable gate array (FPGA), and a programmable logic array (PLA). The processor 701 may also include a main processor and a coprocessor. The main processor is configured to process data in an active state, also referred to as a central processing unit (CPU); the coprocessor is a low-power processor configured to process data in a standby state. In some embodiments, the processor 701 may be integrated with a graphics processing unit (GPU). The GPU is configured to render and draw content that needs to be displayed on a display screen. In some embodiments, the processor 701 may further include an artificial intelligence (AI) processor. The AI processor is configured to process computing operations related to machine learning.

The memory 702 may include one or more computer-readable storage media. The computer-readable storage medium may be non-transient. The memory 702 may further include a high-speed random access memory (RAM) and a non-volatile memory, such as one or more magnetic disk storage devices or flash storage devices. In some embodiments, the non-transitory computer-readable storage medium in the memory 702 is configured to store at least one instruction, and the at least one instruction is configured to be executed by the processor 701 to implement all or part of steps performed by a terminal in the information display method provided in the method embodiments of the present disclosure.

In some embodiments, the computer device 700 further in some embodiments includes a peripheral interface 703 and at least one peripheral. The processor 701, the memory 702, and the peripheral device interface 703 may be connected by a bus or a signal cable. Each peripheral device may be connected to the peripheral device interface 703 through a bus, a signal cable, or a circuit board. Specifically, the peripheral includes at least one of a radio frequency (RF) circuit 704, a display screen 705, a camera component 706, an audio circuit 707, a positioning component 708, and a power supply 709.

The camera component 706 is configured to collect an image or a video. In some embodiments, the camera 706 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or other fusion shooting functions. In some embodiments, the camera 706 may further include a flash. The flash may be a single-color-temperature flash, or may be a double-color-temperature flash. The double-color-temperature flash refers to a combination of a warm-light flash and a cold-light flash, and may be used for light compensation at different color temperatures.

In some embodiments, the computer device 700 further includes one or more sensors 710. The one or more sensors 710 include, but are not limited to, an acceleration sensor 711, a gyroscope sensor 712, a pressure sensor 713, a fingerprint sensor 714, an optical sensor 715, and a proximity sensor 716.

A person skilled in the art may understand that the structure shown in FIG. 7 does not constitute any limitation on the computer device 700, and the computer device may include more components or fewer components than those shown in the figure, or some components may be combined, or a different component deployment may be used.

In an exemplary embodiment, a non-transitory computer-readable storage medium including instructions is further provided, such as a memory including computer programs (instructions). The foregoing programs (instructions) may be executed by a processor in a computer device to complete all or part of the steps in the methods according to any one of the foregoing embodiments of the present disclosure. For example, the non-transitory computer-readable storage medium may be a read-only memory (ROM), a random access memory (RAM), a compact disc ROM (CD-ROM) driver, a magnetic tape, a floppy disk, an optical data storage device or the like. In some embodiments, the storage medium stores at least one instruction, at least one program, a code set, or an instruction set, the at least one instruction, the at least one program, the code set, or the instruction set being loaded and executed by the processor to implement the image display method involved in the foregoing embodiments.

The embodiments of the present disclosure further provide a computer program product or a computer program. The computer program product or the computer program includes computer instructions, the computer instructions being stored in a computer-readable storage medium. A processor of a computer device reads the computer instructions from the computer-readable storage medium, and executes the computer instructions, to cause the computer device to perform the image display method provided in the various example implementations according to the foregoing embodiments.

Other embodiments of the present disclosure are apparent to a person skilled in the art from consideration of the specification and practice of the disclosure here. The present disclosure is intended to cover any variations, uses or adaptive changes of the present disclosure. Such variations, uses or adaptive changes follow the general principles of the present disclosure, and include well-known knowledge and technical means in the art that are not disclosed in the present disclosure. The specification and the embodiments are considered as merely exemplary, and the real scope and spirit of the present disclosure are pointed out in the following claims.

It is to be understood that the present disclosure is not limited to the accurate structures that are described above and that are shown in the accompanying drawings, and modifications and changes may be made without departing from the scope of the present disclosure. The scope of the present disclosure is subject only to the appended claims.

What is claimed is:

1. An image display method, the method being performed by an augmented reality (AR) device, the method comprising:
   obtaining a first homography matrix between a first target plane and a second target plane according to a target matching algorithm for the first target plane and the second target plane, the first target plane being a target plane of a current frame image, the second target plane being a target plane of a first frame image;
   calculating a second homography matrix between the first target plane and the second target plane according to a target displacement and an attitude, the attitude indicating a direction vector of a current orientation of an inertial measurement unit (IMU) coordinate system relative to an original orientation of the IMU coordinate system, the target displacement being a displacement of a camera coordinate system of the current frame image relative to a camera coordinate system of the first frame image;
   using the first homography matrix and the second homography matrix as homography matrices between the first target plane and the second target plane;
   updating the target displacement according to the homography matrices and the attitude;
   obtaining a target displacement according to the homography matrix and an attitude, the attitude indicating a direction vector of a current orientation of an inertial measurement unit (IMU) coordinate system relative to an original orientation of the IMU coordinate system, the target displacement being a displacement of a camera coordinate system of the current frame image relative to a camera coordinate system of the first frame image;
   obtaining a target pose according to the target displacement, the target pose including a position and an attitude of the camera coordinate system of the current frame image in a world coordinate system; and
   displaying an AR image in the current frame image according to the target pose.

2. The method according to claim 1, wherein the attitude comprises an attitude corresponding to the current frame image and an attitude corresponding to the first frame image, and the calculating a second homography matrix between the first target plane and the second target plane according to the target displacement and the attitude comprises:
   obtaining a rotational attitude of an image shooting component corresponding to the current frame image according to the attitude corresponding to the current frame image, the rotational attitude indicating an attitude of the image shooting component relative to a target direction;
   obtaining a rotational attitude of the image shooting component corresponding to the first frame image according to the attitude corresponding to the first frame image;
   calculating a normal vector of the target plane according to the rotational attitude of the image shooting component corresponding to the first frame image; and
   calculating the second homography matrix according to the target displacement, the rotational attitude of the image shooting component corresponding to the current frame image, the rotational attitude of the image shooting component corresponding to the first frame image, and the normal vector of the target plane.

3. The method according to claim 2, wherein the camera coordinate system is a coordinate system established according to the image shooting component in the AR device.

4. The method according to claim 1, wherein the obtaining a target displacement according to the homography matrices and an attitude comprises:
   establishing a target expression according to the first homography matrix and the second homography matrix, the target expression indicating that the first homography matrix is equal to the second homography matrix, the target expression comprising a displacement factor used for denoting the target displacement;
   adjusting a value of the displacement factor based on an adjustment target of reducing a value of the target expression; and
   determining a value corresponding to the displacement factor when the value of the target expression is minimal as the target displacement.

5. The method according to claim 1, wherein the AR device comprises a display screen, and before the obtaining a homography matrix between a first target plane and a second target plane according to the first target plane and the second target plane, the method further comprises:
   determining pixel coordinates in response to a trigger operation on the display screen, the trigger operation being configured to trigger placing of an AR model;
   determining a placement position of the AR model according to the pixel coordinates; and
   establishing the world coordinate system by using the placement position of the AR model as an origin of the world coordinate system.

6. The method according to claim 5, further comprising:
   calculating target coordinates according to the pixel coordinates, the target coordinates being coordinates of the placement position of the AR model relative to the camera coordinate system;
   obtaining a first pose according to the target coordinates, the first pose being a position and an attitude of the camera coordinate system of the first frame image in the world coordinate system;
   wherein the displaying an AR image in the current frame image according to the target pose comprises:
   displaying the AR image in the current frame image according to the first pose and the target pose.

7. The method according to claim 1, wherein the target plane is a plane in which an AR model is placed in the AR image.

8. The method according to claim 1, wherein the first frame image is an AR image when the AR device displays an AR model for the first time.

9. An image display apparatus, comprising a processor and a memory, the memory storing at least one instruction, at least one program, a code set or an instruction set, the at least one instruction, the at least one program, the code set or the instruction set being loaded and executed by the processor to implement:
   obtaining a first homography matrix between a first target plane and a second target plane according to a target matching algorithm for the first target plane and the second target plane, the first target plane being a target plane of a current frame image, the second target plane being a target plane of a first frame image;

calculating a second homography matrix between the first target plane and the second target plane according to a target displacement and an attitude, the attitude indicating a direction vector of a current orientation of an inertial measurement unit (IMU) coordinate system relative to an original orientation of the IMU coordinate system, the target displacement being a displacement of a camera coordinate system of the current frame image relative to a camera coordinate system of the first frame image;

using the first homography matrix and the second homography matrix as homography matrices between the first target plane and the second target plane;

updating the target displacement according to the homography matrices and the attitude;

obtaining a target pose according to the target displacement, the target pose including a position and an attitude of the camera coordinate system of the current frame image in a world coordinate system; and displaying an AR image in the current frame image according to the target pose.

10. The apparatus according to claim 9, wherein the attitude comprises an attitude corresponding to the current frame image and an attitude corresponding to the first frame image, and the calculating a second homography matrix between the first target plane and the second target plane according to the target displacement and the attitude comprises:

obtaining a rotational attitude of an image shooting component corresponding to the current frame image according to the attitude corresponding to the current frame image, the rotational attitude indicating an attitude of the image shooting component relative to a target direction;

obtaining a rotational attitude of the image shooting component corresponding to the first frame image according to the attitude corresponding to the first frame image;

calculating a normal vector of the target plane according to the rotational attitude of the image shooting component corresponding to the first frame image; and calculating the second homography matrix according to the target displacement, the rotational attitude of the image shooting component corresponding to the current frame image, the rotational attitude of the image shooting component corresponding to the first frame image, and the normal vector of the target plane.

11. The apparatus according to claim 10, wherein the camera coordinate system is a coordinate system established according to the image shooting component of an AR device.

12. The apparatus according to claim 9, wherein the obtaining a target displacement according to the homography matrix matrices and an attitude comprises:

establishing a target expression according to the first homography matrix and the second homography matrix, the target expression indicating that the first homography matrix is equal to the second homography matrix, the target expression comprising a displacement factor used for denoting the target displacement;

adjusting a value of the displacement factor based on an adjustment target of reducing a value of the target expression; and determining a value corresponding to the displacement factor when the value of the target expression is minimal as the target displacement.

13. The apparatus according to claim 9, wherein, and before the obtaining a homography matrix between a first target plane and a second target plane according to the first target plane and the second target plane, the method further comprises:

determining pixel coordinates in response to a trigger operation on a display screen, the trigger operation being configured to trigger placing of an AR model; determining a placement position of the AR model according to the pixel coordinates; and establishing the world coordinate system by using the placement position of the AR model as an origin of the world coordinate system.

14. The apparatus according to claim 13, wherein the processor is further configured to perform:

calculating target coordinates according to the pixel coordinates, the target coordinates being coordinates of the placement position of the AR model relative to the camera coordinate system;

obtaining a first pose according to the target coordinates, the first pose being a position and an attitude of the camera coordinate system of the first frame image in the world coordinate system;

wherein the displaying an AR image in the current frame image according to the target pose comprises:

displaying the AR image in the current frame image according to the first pose and the target pose.

15. The apparatus according to claim 9, wherein the target plane is a plane in which an AR model is placed in the AR image.

16. The apparatus according to claim 9, wherein the first frame image is an AR image when an AR model is displayed for the first time.

17. A non-transitory computer-readable storage medium, the storage medium storing a computer program, the computer program being configured to cause a processor to perform:

obtaining a first homography matrix between a first target plane and a second target plane according to a target matching algorithm for the first target plane and the second target plane, the first target plane being a target plane of a current frame image, the second target plane being a target plane of a first frame image;

calculating a second homography matrix between the first target plane and the second target plane according to a target displacement and an attitude, the attitude indicating a direction vector of a current orientation of an inertial measurement unit (IMU) coordinate system relative to an original orientation of the IMU coordinate system, the target displacement being a displacement of a camera coordinate system of the current frame image relative to a camera coordinate system of the first frame image;

using the first homography matrix and the second homography matrix as homography matrices between the first target plane and the second target plane;

updating the target displacement according to the homography matrices and the attitude;

obtaining a target pose according to the target displacement, the target pose including a position and an attitude of the camera coordinate system of the current frame image in a world coordinate system; and displaying an AR image in the current frame image according to the target pose.

* * * * *